Sept. 24, 1968  F. J. SOBANIK  3,402,772
REDUNDANTLY RETAINED COUNTERWEIGHTS FOR HELICOPTER ROTOR BLADE
Filed June 5, 1967  2 Sheets-Sheet 1
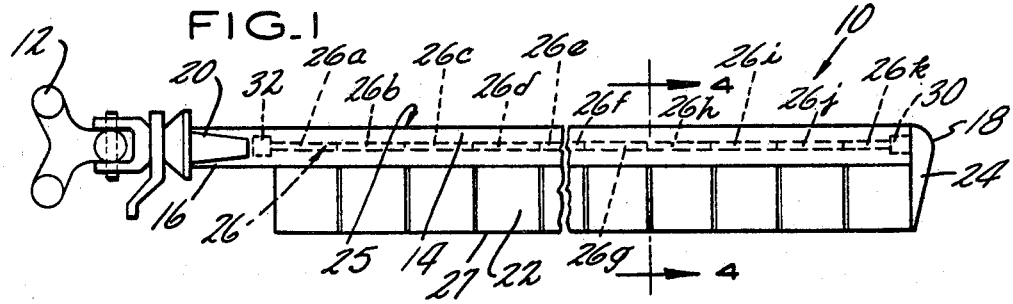
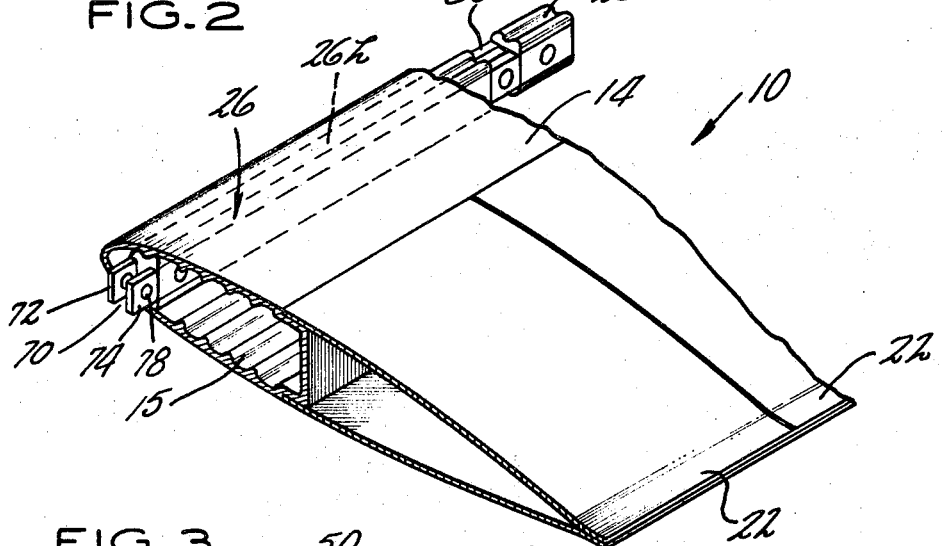
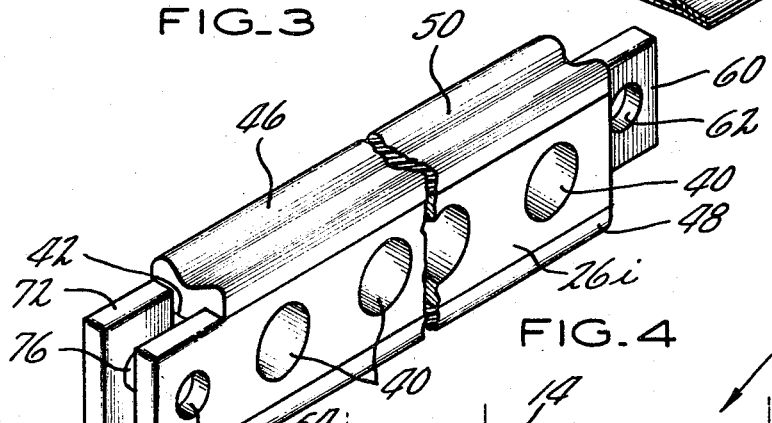
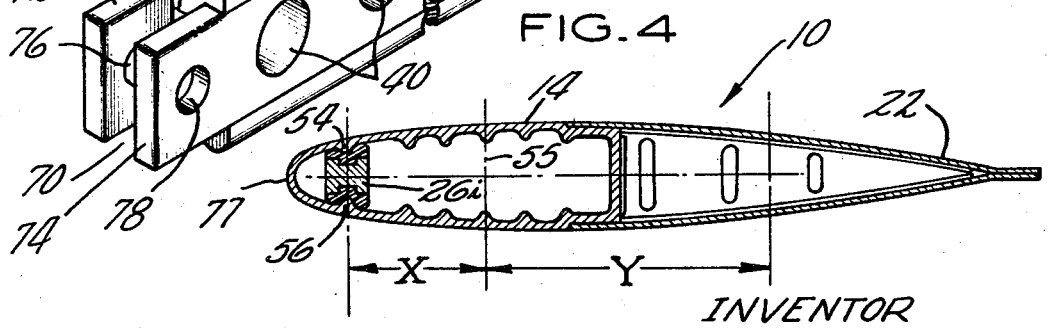
INVENTOR
FRANK J. SOBANIK
BY Vernon F. Hauschild
ATTORNEY Sept. 24, 1968  F. J. SOBANIK  3,402,772
REDUNDANTLY RETAINED COUNTERWEIGHTS FOR HELICOPTER ROTOR BLADE
Filed June 5, 1967  2 Sheets-Sheet 2
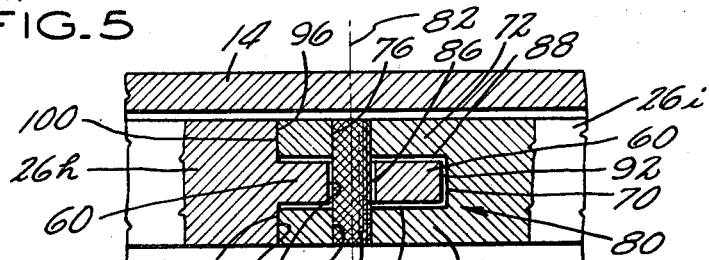
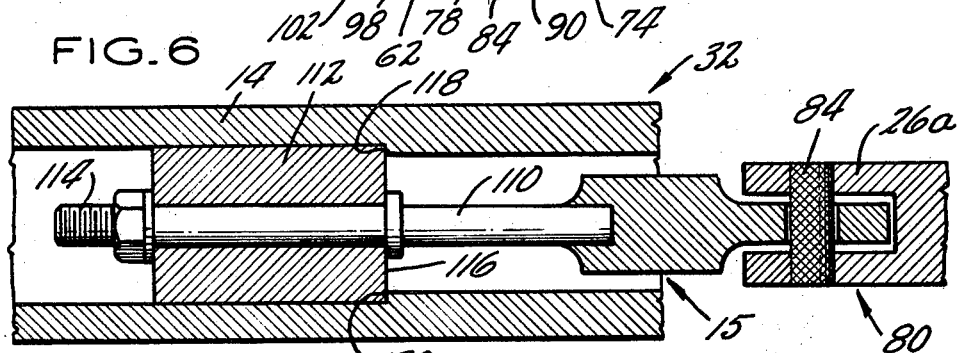
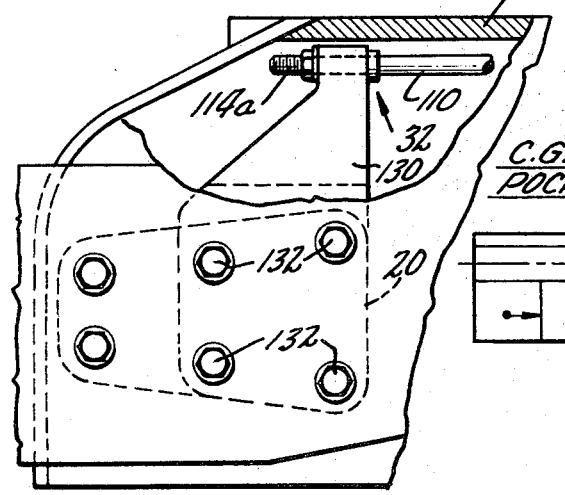
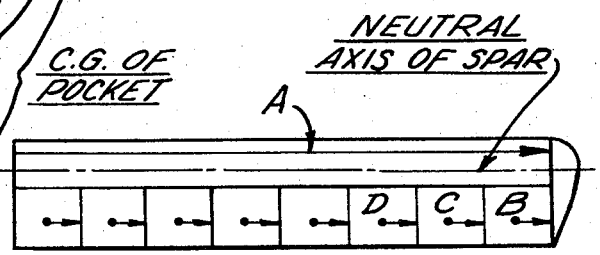
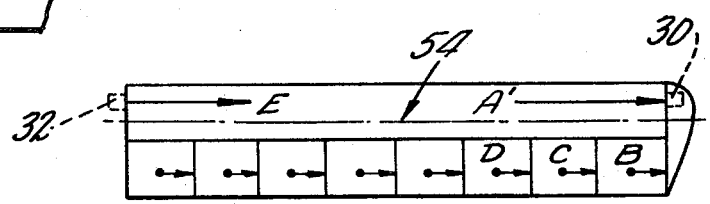
INVENTOR
FRANK J. SOBANIK
BY Vernon F. Hauschild
ATTORNEY United States Patent Office 3,402,772
Patented Sept. 24, 1968

3,402,772
REDUNDANTLY RETAINED COUNTERWEIGHTS
FOR HELICOPTER ROTOR BLADE
Frank J. Sobanik, Stratford, Conn., assignor to United
Aircraft Corporation, East Hartford, Conn., a corporation of Delaware
Filed June 5, 1967, Ser. No. 643,549
10 Claims. (Cl. 170—159)

ABSTRACT OF THE DISCLOSURE

A series of nonstructural counterweights extending in a chain along the span and within the interior of a hollow section of a helicopter blade and with redundant retention systems for the counterweight chain. Each counterweight is joined through a loose knuckle joint to the adjoining counterweights to produce the counterweight chains and a counterweight retention block is provided at the blade tip against which the counterweight chain bears due to centrifugal force loading for retention during blade rotation. A second counterweight retention system is provided which includes a member connecting the inboard counterweight to the hollow blade section so as to coact with said knuckle joints to retain the counterweight chain within the hollow blade section should the counterweight retaining block fail.

Background of the invention

This invention relates to counterweights used in a helicopter rotor blade and more particularly to a counterweight system having redundant counterweight retention mechanisms.

In the helicopter blade art, a series of separate counterweights have been placed so as to extend in a line in a spanwise direction along the leading edge of a blade within a hollow load carrying member so as to counteract the effect of nonstructural pockets or other members which extend rearwardly from that member. This prior art construction is shown in U.S. Patent No. 2,754,917 and consists of a plurality of such counterweights each abutting against the next outboard counterweight while the farthest outboard abuts against a counterweight retaining block which is secured to the blade at the blade tip. Centrifugal force acts upon each counterweight so that each counterweight bears against the next outboard counterweight and subsequently bears against the retaining block so that a centrifugal moment is generated which will be equal and opposite to the centrifugal moment created by the nonstructural pockets which form the blade trailing edge. Such a construction of counterweights has many advantages in that it not only establishes a counteracting centrifugal moment to the centrifugal moment created by the nonstructural trailing edge pockets, but also in that the counterweights are individually mounted and hence the number of counterweights and the weight of each such counterweights in the series of counterweights can be selected for best effectiveness. While this system has proved satisfactory in operation, this prior art construction has a single counterweight retention system, namely, the retaining block in the blade tip, and when this retaining block is lost due to any type of malfunction, the individual unrestrained counterweights being acted upon by centrifugal force are expelled from the blade tip, thereby throwing both the blade and the rotor into unbalance with the prospect of catastrophic results. In addition, the individual counterweights so expelled are traveling at high velocity and are capable of seriously injuring personnel and the helicopter.

Summary of invention

A primary object of the present invention is to provide a second or redundant counterweight retention system for this chain of counterweights which will operate so that the counterweights act in their usual fashion and are retained by the tip retention block during normal operation but which prevents the counterweights from leaving the blade if the tip retention block is lost.

In accordance with the present invention, adjacent counterweights are joined by a loose knuckle joint so that the counterweights coact to form a counterweight chain or train projecting in a spanwise direction within a hollow member of the helicopter blade, such as the helicopter spar. Since the knuckle joints are loose, centrifugal force will cause each counterweight to bear against the next outboard counterweight and will therefore cause all counterweights to bear against the tip retention block during normal blade operation. The innermost or farthest inboard counterweight is secured to the blade so that, if the tip retaining block is lost, the coaction of this retention means for the innermost counterweight and the knuckle joints serve to retain the counterweight chain within the hollow blade member.

The invention permits redundant retention of the blade counterweights without adding to blade weight or adversely affecting the blade weight distribution, the blade stiffness, the dynamic characteristics of the blade, the removability of the counterweight, or the repairability of the blade.

In accordance with the further aspect of the present invention, the individual counterweights in the counterweight chain or train are connected to adjacent counterweights in a loose knuckle joint or tongue and groove joint so that the counterweight chain is able to move with the remainder of the blade in blade flapping, blade lead-lag and all other blade motions without resisting such blade motion and further wherein the counterweights can all act against either the blade tip retaining block or the inboard counterweight retaining mechanism due to the action of centrifugal force.

This invention also permits altering the natural frequency of the blade by selectively controlling the amount of play in the knuckle joints between counterweights so that, for example, all of the outer counterweights bear against the tip retaining block while all of the inner counterweights bear against the connecting means of the redundant retention system.

This invention also provides a redundant counterweight system wherein the counterweights envelope is unchanged so that minimum weight is added to the system and wherein the number and weight or density of the counterweights can be varied to produce optimum counteracting moment at each blade station.

Brief description of the drawings

FIG. 1 is a top view of a conventional helicopter blade using the redundant counterweight system taught herein.

FIG. 2 is a perspective showing, partly in cross section and partly broken away, to illustrate our counterweights in position and to show their position with respect to the nonstructural trailing edge pockets, FIG. 3 is a perspective showing of an individual counterweight showing a portion of the counterweight-to-counterweight retention mechanism at the opposite ends thereof.

FIG. 4 is a cross-sectional showing taken along line 4—4 of FIG. 1 to aid in illustrating the centrifugal moments created by the nonstructural trailing edge pockets and a nonstructural counterweight.

FIG. 5 is a cross-sectional showing of the knuckle joint or pinned tongue and groove joint between adjacent counterweights of this invention.

FIG. 6 is a cross-sectional showing through the blade spar and shows the inward or inboard counterweight connected to the hollow blade member by one retention mechanism.

FIG. 7 shows another mechanism for connecting the inboard counterweight to the remainder of the blade.

FIG. 8 is a showing of the helicopter blade to illustrate the centrifugal moments created by the helicopter blade counterweights and trailing edge pockets about the blade neutral axis during normal operation.

FIG. 9 is similar to FIG. 8 but illustrates the moment creating effect of the counterweights when used to either vary blade natural frequency or to aid in describing the counterweight moment action when the secondary or redundant counterweight system creates a moment at the blade inner section after the first or normal counterweight retention system has failed and no longer creates a moment at the blade outer end.

*Description of the preferred embodiment*

Referring to FIG. 1 we see conventional helicopter blade 10 which projects from rotor head 12 of a conventional helicopter (not shown) but which may be of the type shown in U.S. Patent No. 3,135,487, for rotation about the rotor head 12 with one or more additional similar blades to create a lifting force to sustain a helicopter in flight. Blade 10 includes hollow structural spar 14 which extends along the span of the blade 10 between blade root 16 and blade tip 18. Spar 14 is connected to rotor 12 through bifurcated root retention member 20. A series of nonstructural trailing edge pockets or boxes 22 are connected to spar 14 and coact therewith to form an airfoil cross section for blade 10 with a chord dimension extending between the leading edge 25 and trailing edge 27 of the blade. Tip cap 24 fits over the outer edge of spar 14 and the outermost of the trailing edge pockets 22. A nonstructural counterweight chain or train 26 extends within the interior of hollow spar 14 along the span of the blade 10 for substantially the full length thereof and includes inboard or innermost counterweight 26a, outboard or outward counterweight 26k and a plurality of counterweights illustrated as 26b through 26j therebetween. Blade tip retaining block 30 is located within the interior of spar 14 and connected to the blade in any convenient manner such as nut and bolt arrangements or rivets (not shown). The nonstructural counterweights 26a through 26k are connected to one another in a manner to be described hereinafter so that during normal blade operation, centrifugal force acting on each counterweight will cause all of the counterweights to bear against the tip retaining block 30. A secondary or redundant counterweight retention system is illustrated as element 32 in FIG. 1 and, in a fashion to be described hereinafter, serves to connect the innermost counterweight 26a to the remainder of the blade or spar 14. Redundant counterweight retention system 32 is shown connecting the inboard or innermost counterweight 26a to some portion of blade 10 such as spar 14 and, due to the connection between adjacent counterweights 26a through 26k, it will be seen that when tip retention block 30 is no longer present due to a malfunction to retain counterweight chain 26 all counterweight chain 26 will be retained in postion by redundant counterweight retention system 32.

My counterweight chain 26 is shown in position within helicopter blade 10 in greater particularity in FIG. 2. Counterweights 26h and 26i are shown for purposes of illustration. As best shown in FIG. 3, each counterweight such as 26i may be machined from bar stock or any other suitable metal and may contain lightening holes 40 extending therethrough in chordwise direction. Grooves such as top groove 42 and a corresponding bottom groove (not shown) are machined in the top and bottom of the counterweight 26i and receive rubber-like members 46 and 48 therein and bonded thereto. Each of the bonded members 46 and 48 includes a spanwise extending indenture, such as 50, which is shaped to receive and mate with spanwise extending and inwardly projecting beads 54 and 56 of spar 14 (see FIG. 4). The counterweights could also be positioned between beads 54 and 56 and the blade leading edge 77 to produce maximum moment. In this fashion, each counterweight, such as 26i shown in FIG. 3, is resiliently and hence not structurally mounted within spar 14 and hence is a nonstructural counterweight. Still viewing FIG. 3 it will be seen that at one end of counterweight 26i there is a projection or tongue 60 with a chordwise extending aperture 62 extending therethrough. At the opposite end of the counterweight 26i there is chordwise extending land 70 defined between chordwise extending projections 72 and 74 which have aligned chordwise extending apertures 76 and 78 therein. As illustrated in FIG. 2, the projection 60 of one counterweight coacts with the land 70 of the adjacent counterweight to form a knuckle joint or land and grooved pin 80 therebetween. The projection 60 and land 70 could well be reversed in location at the opposite ends of each counterweight.

Still referring to FIG. 2 we see that nonstructural trailing edge pockets 22 are bonded to the trailing edge of spar 14 and coact therewith to define an airfoil cross section for blade 10. Blade 10 and its attachment to the rotor are more fully described in U.S. Patents 3,097,701 and 2,754,917.

Knuckle joint 80 is best shown in FIG. 5 as it joins adjacent nonstructural counterweights 26h and 26i. Counterweight 26h is illustrated as having projection or lip 60 projecting from the outer end thereof and having chordwise aperture 62 extending therethrough. Counterweight 26i has land 70 at the inboard end thereof defined between chordwise extending projects 72 and 74 which have apertures 76 and 78 therein. It will be noted that apertures 62, 76 and 78 align in a chordwise direction along axis 82 and that cylindrical pin 84 projects therethrough in pressed fit fashion through apertures 76 and 78 in a loose fit through aperture 62 to define gap 86 between pin 84 and aperture 62. It will also be noted that projection 60 is sufficiently smaller than land 72 that there are fore and aft gaps 88 and 90 as well as outboard gap 92 defined therebetween. To insure that, due to the action of centrifugal loading during the rotation of blade 10 around rotor 12, each counterweight is caused to bear against all counterweights outboard thereof, it is essential that any gap which exists between surfaces 96 and 98 of counterweight 26h and surfaces 100 and 102 of counterweight 26i abut during operation to permit centrifugal load transfer from each counterweight to the succeeding outboard counterweight so that the centrifugal loading of all counterweights will act upon tip retention block 30. Accordingly, the installation gap between surfaces 96 and 98 and surfaces 100 and 102 must be less than the gap 86 between pin 84 and aperture 62 and outboard gap 92. It will be noted that since pin 84 is loosely received in projection 60 and since there is gap (88–92–90) throughout the periphery of projection 60 and groove 70, that adjacent counterweights such as 26h and 26i are free to move relative to one another in all directions, thereby permitting complete unimpeded blade motion. It will be evident to those skilled in the art that pin 84 could also be received tightly in aperture 62 and loosely in apertures 76 and 78.

As best shown in FIG. 6, the innermost or inboard conuterweight 26a is connected by knuckle joint 80 of the type just described in connection with FIG. 5 to cable or rod 110, which may be swaged thereto, to retention block 112 by shouldered bolt and nut member 114. Block member 112 has an outboard surface 116 which bears against shoulders 118 and 120 in spar 14. In this manner, it will be noted that the inboard counterweight 26a is connected to spar 14 through inboard retention mechanism 32 and, in view of the knuckle joints 80 between all adjacent counterweights, when tip retention block 30 is lost due to malfunction, inboard retention mechanism 32 and the knuckle joint 80 will coact to retain all counterweights 26a through 26k in position within the interior 15 of spar 14. Pin 84 in the FIG. 6 construction is perpendicular to pin 84 of the FIG. 5 construction and this is acceptable so long as all pins in each counterweight chain extend in the same direction.

Referring to FIG. 7 we see another method of retaining inboard counterweight 26a (not shown) to the blade 10 through cable or rod 110. In the FIG. 7 embodiment, cable 110 is connected by shouldered bolt and nut member 114a to retaining member 130, which is attached to spar 14 and blade root retaining member 20 by bolts such as 132. Accordingly, by using the mechanism shown in FIG. 6 or the mechanism shown in FIG. 7, when tip retaining block 30 of blade 10 fails, the chain or train of counterweights 26 are connected to blade 10, and in particular spar 14 thereof, by redundant or secondary inboard retention mechanism 32.

Referring to FIG. 4 we see blade 10 in cross section and we note that nonstructural pockets 22 create a centrifugal moment at arm Y rearwardly from blade feathering axis 55 while counterweight string or chain 26 forms a counteracting centrifugal moment at its moment arm X forward of feathering axis 55. These centrifugal moments are best illustrated in FIG. 8 in which moment A illustrates the centrifugal moment of the counterweight chain 26 and the additive moments B, C and D and the other moments illustrated illustrate the additive centrifugal moments of the nonstructural pockets 22. As previously described, when tip retaining block 30 is in position, all the counterweights of counterweight chain 26 coact thereagainst due to centrifugal force and when retaining block 30 is no longer in position, all counterweights of counterweight chain 26 are retained in position by redundant counterweight retention mechanism 32 of the type shown either in FIG. 6 or 7. This moment creating relationship is best illustrated in FIG. 9 wherein centrifugal moments of pockets 22 are depicted by moments B, C, D, etc., and have counteracting moment A′ acting thereagainst at tip retaining block 30 when tip retaining block 30 is in its normal operating position. When tip retaining block 30 is no longer in its operating position but has been lost due to malfunction, moment E is then created by the counterweight chain 26 against secondary or redundant retention mechanism 32.

It is a feature of this redundant system that the natural frequency of blade 10 can be altered, as desired, by proper selection of the elements of counterweight chain 26. This may be done by selecting a particular number of outboard counterweights having knuckle joint connections 80 therebetween of the loose fit variety shown in FIG. 5 so that, during blade rotation, these counterweights will act against blade retaining member 30 to develop centrifugal moment A′ as shown in FIG. 9. At the same time the inboard counterweights will be connected by a knuckle joint similar to 80 as shown in FIG. 5, but without a gap between pin 84 and apertures 76, 62, and 78 and preferably with play between surfaces 96, 98, and 100 and 102 so that the selected number of inboard counterweights will establish centrifugal moment E against the secondary retention mechanism 32 as shown in FIG. 9.

It is to be understood that the invention is not limited to the specific embodiment herein illustrated and described but may be used in other ways without departure from its spirit as defined by the following claims.

I claim:

1. A helicopter rotor blade having:
   (a) a hollow airfoil member extending along the span of the blade,
   (b) a plurality of nonstructural counterweights including an inboard counterweight, an outboard counterweight and at least one counterweight therebetween positioned within the hollow portion of said blade member and extending along the span of the blade,
   (c) first means for retaining all of said counterweights within said hollow airfoil member, and
   (d) second means for retaining all of said counterweights within said hollow airfoil member.

2. Apparatus according to claim 1 and wherein said counterweights are connected by loose knuckle joints to form a counterweight chain and wherein said first means retains said outboard counterweight in position to thereby retain said counterweight chain in position during blade rotation and further wherein said second means retains said inboard counterweight in position thereby retaining said counterweight chain in position during blade rotation when said first means has failed.

3. A helicopter blade having:
   (a) an airfoil blade with a hollow portion extending spanwise of the blade,
   (b) a plurality of nonstructural counterweights including an inboard counterweight, an outboard counterweight and at least one counterweight therebetween positioned within the hollow portion of said blade member and extending along the span of the blade and adapted to abut one another during rotor operation,
   (c) first means to retain said counterweights within said blade hollow portion when so abutted, and
   (d) second means connecting said counterweights to one another and to said blade hollow portion for retention therewithin.

4. Apparatus according to claim 3 wherein said second means is operable as a counterweight retention means only after said first counterweight retention means has failed.

5. A helicopter blade having:
   (a) a hollow blade member extending spanwise along the helicopter blade,
   (b) a plurality of counterweights including an outboard counterweight, an inboard counterweight and at least one intermediate counterweight therebetween positioned spanwise of the blade within said hollow member and connected by knuckle joints to form a counterweight chain and adapted to abut due to centrifugal force as said blade rotates,
   (c) first means positioned within said hollow member outboard of said outboard counterweight and against which said outboard counterweight bears during blade rotation to retain said counterweights so abutted within said hollow blade member,
   (d) and second counterweight retention means connecting said inboard counterweight to said blade hollow member so as to retain all of said counterweights within said hollow blade member due to the knuckle joint connection therebetween should said first counterweight retention means fail.

6. A helicopter rotor blade member extending along the span and including:
   (a) a load carrying hollow blade member extending along the span of the blade,
   (b) a plurality of individual counterweights including an outboard counterweight and an inboard counterweight and at least one counterweight therebetween positioned along said blade span within said hollow member and with each of said counterweights having a tongue projection and a groove projection at its opposite ends mating with such projections of adjacent counterweights and with a pin extending in a chord-wise direction and connecting each mating tongue and groove to form knuckle joints between adjacent counterweights and wherein said knuckle joints have play therein so that controlled relative motion between adjacent counterweights is permissible, (c) first counterweight retention means including a block member attached to said hollow blade member and positioned outboard of said outboard counterweight so that, as said play in said knuckle joints is taken up in one direction during blade rotation, all of said counterweights bear against said block member to retain said counterweights within said hollow blade member and (d) second counterweight retention means including means connecting said inboard counterweight to said hollow blade member so that, as said play in said knuckle joints is taken up in the opposite direction after said first counterweight retention means has failed, said second counterweight retention will retain said counterweights within said hollow blade member due to the coaction of said knuckle joints and said second counterweight retaining means.

7. A helicopter blade having both a leading edge, a trailing edge and both span and chord dimension and including:
 (a) a hollow blade spar positioned at the leading edge of the blade and extending along the span thereof,
 (b) a plurality of nonstructural pockets connected to said spar and cooperating therewith to form a helicopter blade of airfoil cross section and with said nonstructural pockets positioned adjacent one another in a spanwise direction along the spar to form said blade trailing edge,
 (c) a plurality of nonstructural counterweights positioned within said hollow spar and extending spanwise thereof and including an outboard counterweight, an inboard counterweight, and at least one counterweight therebetween,
 (d) knuckle joints connecting adjacent counterweights to form a counterweight chain and wherein said knuckle joints include pin members extending in a chord-wise direction and passing through chord-wise aligned apertures of adjacent counterweights to connect adjacent counterweights in a loose fit,
 (e) a first counterweight retention means including a block member positioned outboard of said outboard counterweight and retained within said hollow spar to retain said counterweights within said hollow spar when said counterweights react to centrifugal force to take up the play in said loose fit of said knuckle joints and bear against one another during blade rotation.
 (f) and second counterweight retention means including means connecting said inboard counterweight to said hollow spar member so that said counterweights are retained within said hollow spar member when said first counterweight retention means fails due to the coaction of said knuckle joints and said inboard counterweight retention means.

8. Apparatus according to claim 7 and wherein said hollow spar member includes aligned top and bottom beads projecting inwardly from the inner walls thereof and extending along the blade span and wherein each of said counterweights is a metal member extending along the span of said blade between said beads and including rubberlike material bonded to the top and bottom thereof, which rubberlike material is shaped to the contour of said beads and positioned to mate with said beads to retain said counterweights in a selected chord-wise position within said spar.

9. Apparatus according to claim 7 wherein the looseness of fit in the knuckle joints between a selected number of counterweights adjacent the outboard counterweight causes these counterweights to bear against said first counterweight retaining means during blade rotation and wherein the play in said knuckle joints between a selected number of counterweights adjacent said inboard counterweight causes these counterweights to bear against said second counterweight retaining means during blade rotation to thereby selectively vary the natural frequency of said helicopter blade.

10. A helicopter blade having:
 (a) a hollow blade member extending spanwise along the helicopter blade,
 (b) a plurality of counterweights including an outboard counterweight, an inboard counterweight and at least one intermediate counterweight therebetween positioned spanwise of the blade within said hollow member and connected by knuckle joints to form a counterweight chain and adapted to abut due to centrifugal force as said blade rotates,
 (c) first means positioned within said hollow member outboard of said outboard counterweight and against which said outboard counterweight bears during blade rotation to retain said counterweights so abutted within said hollow blade member,
 (d) and second counterweight retention means connecting said inboard counterweight to said blade hollow member so as to retain all of said counterweights within said hollow blade member due to the knuckle joint connection therebetween should said first counterweight retention means fail and,
 (e) wherein said knuckle joints joining a selected number of counterweights adjacent said outboard counterweight are of loose fit so that the counterweights connected thereby will bear against said outboard counterweight and said first counterweight retention means during blade rotation and further wherein the knuckle joints joining a selected number of counterweights adjacent said inboard counterweight are of a tighter fit so that a selected number of inboard counterweights will be retained in position by said second counterweight retention means, thereby controlling the natural frequency of said helicopter blade.

References Cited

FOREIGN PATENTS 733,026  7/1955  Great Britain.

EVERETTE A. POWELL, JR., *Primary Examiner.*